Nov. 6, 1962 R. W. BUNTENBACH ETAL 3,062,574
PRESSURE RELEASE MECHANISM
Filed Aug. 21, 1959 2 Sheets-Sheet 1

*INVENTORS*
RUDOLPH W. BUNTENBACH
BERTIL V. CARLSON
BY FRANK C. WILLIAMSON

ATTORNEY

Nov. 6, 1962  R. W. BUNTENBACH ETAL  3,062,574
PRESSURE RELEASE MECHANISM
Filed Aug. 21, 1959  2 Sheets-Sheet 2
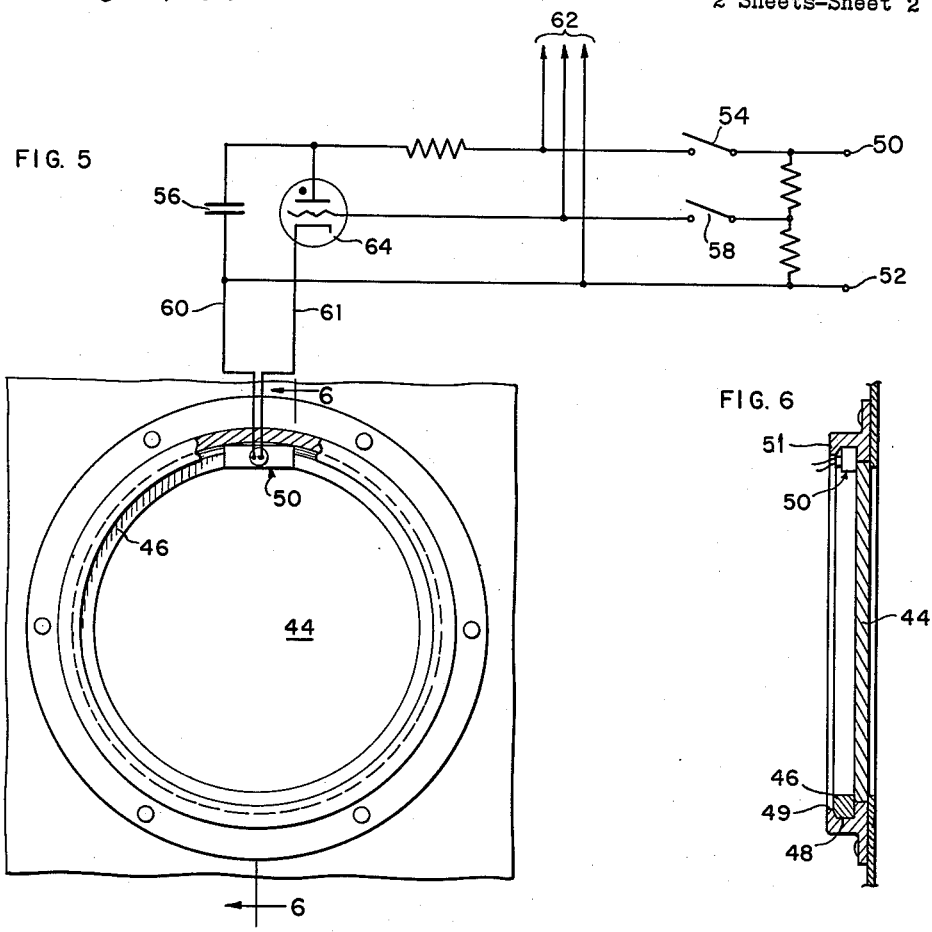
FIG. 5
FIG. 6
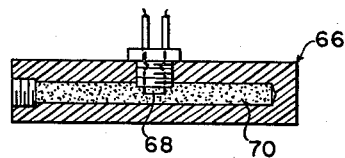
FIG. 7
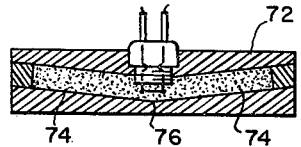
FIG. 8
*INVENTORS*
RULDOLPH W. BUNTENBACH
BERTIL V. CARLSON
FRANK C. WILLIAMSON
BY
ATTORNEY

United States Patent Office 3,062,574
Patented Nov. 6, 1962

3,062,574
PRESSURE RELEASE MECHANISM
Rudolph W. Buntenbach, Lafayette, Bertil V. Carlson, Livermore, and Frank C. Williamson, Hayward, Calif., assignors to General Precision, Inc., a corporation of Delaware
Filed Aug. 21, 1959, Ser. No. 835,215
1 Claim. (Cl. 292—256.65)

This invention relates to novel and improved releasing mechanisms and more particularly to a novel and improved port cover release.

Briefly described, one preferred embodiment of this invention comprises a ring, which may be a C ring, expanded into an annular groove to retain a port cover, and a frangible block or section in said ring which is shattered by means of an exploding bridge wire, thereby permitting collapse of said ring and in turn permitting the release of the port cover.

One object of this invention is to provide a reliable release means for a port cover.

Another object of this invention is to provide a positive and reliable port cover release which can be actuated from a remote control point either automatically or manually.

A further object of this invention is to provide a release mechanism operable from a remote point that is accurate and positive in its releasing action and which can be universally adapted for port covers.

A still further object of the present invention is to provide a novel explosively actuated release mechanism which is insensitive to extreme heat and also shock and vibration for releasing a port cover under severe environmental conditions.

Other objects and advantages of this invention will become apparent when taken in consideration with the accompanying specification and drawings in which:

FIGURE 5 is a semi-diagrammatic elevation showing a modification of this invention, which is particularly adaptable to a port cover such as an escape window for an aircraft, or the like;

FIGURE 6 is a cross sectional view taken along the line 6—6 of FIGURE 5;

FIGURES 7 and 8 show modifications of the bridge wire exploder associated with the frangible block utilized in all embodiments of this invention.

Figure 1:
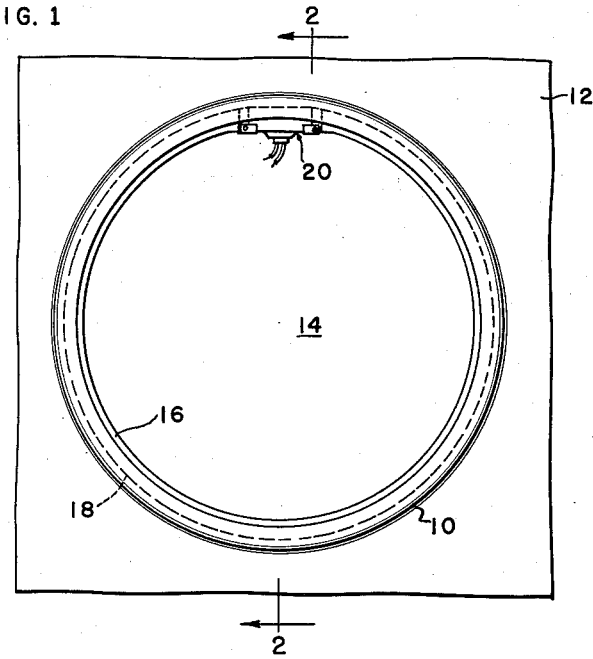
FIGURE 1 shows an elevation of one port release mechanism embodying this invention.
Figure 2:
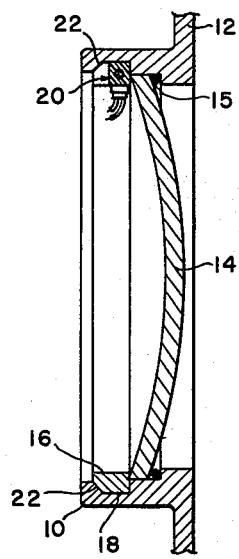
FIGURE 2 is a cross sectional view taken along line 2—2 of FIGURE 1.
Figure 3:
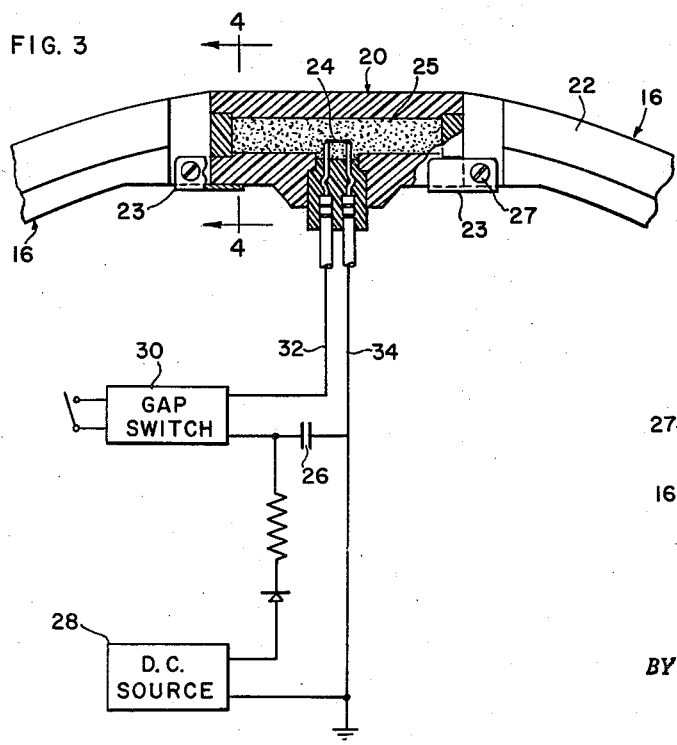
FIGURE 3 is a detail view showing the positioning of the frangible block in the gap of the C ring along with a simplified block diagram of the bridge wire exploding circuitry.

Turning now to a detailed description of this invention, the port cover release for a pressure chamber shown in FIGURES 1, 2 and 3 comprises a housing 10 attached to a supporting structure 12 which may be an integral part of the vehicle or other device on which the release mechanism is mounted. Housing 10 may have any suitable external shape; however, it should be provided with an aperture of preferably the same shape and diameter as the outside diameter of port cover 14 which may be fitted into the aperture of housing 10 with an O ring seal 15, if required, and is held in position by the retaining action of resilient C ring 16 expanded into annular groove 18 in the housing 10 as shown in FIGURE 2. C ring 16 is preferably made of a spring material such as steel or the like and has an outside diameter, when in an unstressed or relaxed condition, which should be approximately equal to or even greater than the diameter of annular groove 18. The length of the gap or opening in the relaxed C ring should preferably be equal to or slightly greater than the length of frangible block 20 which is inserted therein to prevent C ring 16 from contracting and being forced out of annular groove 18 by the pressure inside the chamber.

Figure 4:
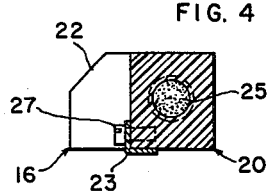
FIGURE 4 is a cross sectional view taken along line 4—4 of FIGURE 3.

Small metallic L-shaped clips 23 mounted near the gap faces of C ring 16 by screws 27 may be utilized to hold frangible block 20 in position as shown in FIGURES 3 and 4.

A detailed description of frangible block 20 will be thoroughly covered in subsequent paragraphs.

C ring 16 and annular groove 18 should preferably have mating bevelled surfaces 22 as shown in FIGURE 2 for the following reasons:

First, the wedging action of block 20 upon C ring 16 will have the effect of forcing C ring 16 against port cover 14, thereby providing a sealing action for the port cover.

Secondly, pressure of force acting against the side of the port cover 14 opposite C ring 16 will tend to secure the locking action between C ring 16 and frangible block 20;

Thirdly, and most important, when frangible block 20 is shattered, the pressure exerted against the C ring by port cover 14 will force the C ring 16 to contract out of channel 18, thus freeing port cover 14.

The optimum angle of bevelled surface 22 is dependent upon the surface finish of the mating surfaces of the C ring 16 and the annular groove 18 and also upon the amount of pressure or force which may be exerted against the face of port cover 14 opposite the C ring. It has been found that operation is satisfactory with bevels ranging between 20° and 45° to the plane of the face of the port cover; exceeding these values may result in either instability of retaining action of the C ring 16 or reduction in reliability of C ring 16 releasing port cover 14 when frangible block 20 is shattered.

Block 20 is preferably made of a frangible material that may be shattered by the explosive action of an exploding bridge wire 24 attached to or imbedded within block 20 as shown in FIGURE 3. The phenomenon of exploding structures with bridge wires is explained in detail in copending application U.S. Serial Number 785,607 filed January 8, 1959 by Carlson, et al., and forms no part of this invention. When bridge wire 24 is exploded, it will produce a shock wave that will shatter the frangible material of block 20. If it is desired, block 20 may be constructed of a material that is not readily shattered and the explosive effect of bridge wire 24 can be substantially increased by the use of an additional pyrotechnic material 25 in conjunction with bridge wire 24. The preferred pyrotechnic material is fully described in copending application U.S. Serial Number 96,482, filed March 17, 1961 by Carlson and Picciano, and its use in connection with exploding bridge wires is explained in copending application Serial Number 785,607 mentioned above. Neither the pyrotechnic material, nor its use in conjunction with an exploding bridge wire, form a part of this invention.

When a proper D.C. voltage is applied to bridge wire 24, the wire 24 and pyrotechnic material 25 will explode and will generate a shock wave that will shatter the frangible block 20 thus permitting C ring 16 to collapse and release port cover 14. The simplified block diagram contained in FIGURE 3 illustrates one typical firing circuit that may be used to provide the required voltage to the bridge wire 24. The energy stored in capacitor 26, which has been charged by D.C. source 28 is released by the closure of gap switch 30 through transmission lines 32 and 34 into exploding bridge wire 24. Since the exploding bridge wire 24 and the preferred pyrotechnic material used therewith are insensitive to heat, shock and vibration, frangible block 20 can only be shattered by deliberate actuation of the firing circuit to release the ring 16.

FIGURES 5 and 6 illustrate a modification of the invention that may be used in an environment in which no pressures or forces act against the port cover 44. In these cases the C ring 46 may have an outside diameter, when in an unstressed or relaxed condition, slightly less than the inside diameter of the aperture 49 formed by the inside lip 51, of groove 48 in housing 40. C ring 46, when expanded into annular groove 48 is locked in the expanded position by wedging frangible block 50 into the C ring gap. When frangible block 50 is shattered, C ring 46 will collapse to release the locking action of port cover 44, which then may be removed manually or by suitable elements, such as springs or the like (not shown).

FIGURE 5 contains a schematic diagram of another firing circuit for the release mechanism. This circuit is basically similar to the block diagram in FIGURE 3 and may be used alternatively. In FIGURE 5 a D.C. source is applied to terminals 50 and 52. Upon closure of arming switch 54, capacitor 56, which may be 1 microfarad, will become charged. Upon closure of firing switch 58, a voltage is applied to the control grid of discharge tube 64 causing discharge of capacitor 56 through tube 64 into wires 60 and 61. Additional release mechanism (not shown) may be actuated by use of transmission lines 62.

FIGURE 7 illustrates another embodiment of frangible block 66 showing exploding bridge 68 with an auxiliary pyrotechnic material 70 embedded within block 66.

FIGURE 8 shows still another embodiment of frangible block 72 with longitudinal chamber 74 drilled to provide a weakened section 76 in block 72 to insure breakage at this point.

The operation of the release mechanism is as follows:

Referring to FIGURES 2 and 3, when capacitor 26 has been charged, the release mechanism is actuated by the closure of firing switch 30. This causes a surge of current to be conducted through wires 32 and 34 causing explosion of wire 24 and subsequent shattering of frangible block 20. When frangible block 20 is shattered, C ring 16 is free to contract and release from annular channel 18, thereby removing all retaining action on port cover 14. When the retaining action is released by the collapse of C ring 16, the port cover 14 will be blown from the port.

If the release mechanism is used on a vehicle wherein no pressures or forces are involved, as in FIGURES 6 and 7, port cover 44 may be removed after release of retaining C ring 46 either manually or by the addition of elements, such as springs or the like, to act against port cover 44 to effect removal.

It is to be understood that modifications in material and shape may be resorted to without departing from the spirit of this invention as set forth in the following claim.

What is claimed is:

A pressure release mechanism comprising a housing having an annular aperture, an annular bevelled groove in said annular aperture, said bevel being approximately 45°, a port cover releasably mounted in said annular aperture of said housing, a resilient C-ring expanded into said annular bevelled groove, and retaining said port cover in said aperture, said C-ring having a bevelled surface of approximately 45° angle adapted to mate with the bevelled surface of said annular bevelled groove, a frangible block wedged into the opening of said C-ring to lock said C-ring in an expanded position, and an exploding bridge wire in said frangible block for shattering said frangible block in response to an electric current so that said resilient C-ring will be caused by the bevelled surfaces co-acting on each other to contract from said annular groove to release said port cover.

UNITED STATES PATENTS

| | | |
|---|---|---|
| 1,140,535 | Schroeder | May 25, 1915 |
| 2,037,536 | Richardson | Apr. 14, 1936 |
| 2,436,364 | McDowell | Feb. 17, 1948 |
| 2,802,422 | Horne | Aug. 13, 1957 |
| 2,850,976 | Seifert | Sept. 9, 1958 |
| 2,878,752 | Johnson et al. | Mar. 24, 1959 |
| 2,926,566 | Atkins et al. | Mar. 1, 1960 |